United States Patent [19]
Ploppa et al.

[11] 3,782,136
[45] Jan. 1, 1974

[54] PULSE GENERATOR FOR AN ELECTRICAL CONTROL SYSTEM OF A MACHINE

[75] Inventors: Jurgen Ploppa; Wilhelm Hadam, both of Reutlingen, Germany

[73] Assignee: H. Stoll and Company, Reutlingen, Stollweg, Germany

[22] Filed: July 31, 1972

[21] Appl. No.: 276,409

[30] Foreign Application Priority Data
Aug. 10, 1971  Germany............... P 21 40 063.5

[52] U.S. Cl..................... 66/75, 66/154 A, 310/168
[51] Int. Cl........................ D04b 7/28, D04b 15/70
[58] Field of Search................... 310/168, 169, 170; 66/154 A, 75

[56] References Cited
UNITED STATES PATENTS

| | | | |
|---|---|---|---|
| 3,564,313 | 2/1971 | Goor | 310/168 |
| 2,669,670 | 2/1954 | Eggers | 310/170 X |
| 1,892,371 | 12/1932 | Tuczek | 310/168 X |
| 3,530,323 | 9/1970 | Applequist | 310/168 |

FOREIGN PATENTS OR APPLICATIONS
990,699  4/1965  Great Britain.................. 310/168

Primary Examiner—Gerald Goldberg
Attorney—Roberts B. Larson et al.

[57] ABSTRACT

A pulse generator for an electrical control system of a machine having relatively movable parts such as for a programmed control system of a knitting machine. One machine part has a permanent magnet forming an air gap with at least one field plate in the air gap arranged such that the current therethrough depends on the nature of the magnetic field in the air gap. The other machine part has on it items to affect the nature of the magnetic field at the air gap upon relative movement of the machine parts, these items including a magnetically conductable body movable through the air gap and/or a magnetically conducting shunt body movable in the vicinity of the air gap. The magnetically conductable body may take the form of teeth on a soft iron comb, a soft iron plate with apertures, or separate soft iron pieces mounted separately for relative movement through the air gap.

10 Claims, 5 Drawing Figures

PULSE GENERATOR FOR AN ELECTRICAL CONTROL SYSTEM OF A MACHINE

BACKGROUND OF THE INVENTION

This invention relates to a pulse generator for an electrical control system of a machine, more particularly a programmed control system of a knitting machine, equipped with parts which move relative to one another.

Many pulse generators or emitters in control systems for machines even today still incorporate mechanical switches and the disadvantage is that they are subject to wear which reduces their period of service, and that arcing can occur during the mechanical contact making and breaking-apart from a soiling and burning of the contact — and this may damage electronic parts of the control system. There are also non-contact pulse emitters, for example photocells or variable inductances. Photocells, however, involve the disadvantage that they need an additional light source which has to be regulated to produce accurate and growing pulse sequences. Such pulse emitters are, moreover, liable to disturbance because the window of the photocell may be soiled or the lamp which serves as a light source may burn out. The danger of contamination of the photocell or the light window thereof is particularly prevalent in the case of knitting machines which produce a considerable amount of fibrous lint.

It has previously been proposed, in connection with a circular knitting machine of the rotary needle cylinder type to provide a pulse generator in the form of a magnetic system the inductivity of which is controlled by bars on the needle cylinder periphery in accordance with the rotary motion of the said cylinder as shown in German Patent No. 1,785,512, to Morat. This arrangement, however, has the disadvantage that it is not very sensitive, that the signals are only of limited power, and that the arrangement cannot be transferred to other machines without further work on them.

It has also previously been proposed to use as pulse emitters resistances in the form of field plates, dependent on a magnetic field, for example in the case of commutatorless direct current motors in which field plates, arranged in the zone of a rotary permanent magnet, control the supply of direct current to individual turns of motor windings.

SUMMARY OF THE INVENTION

The purpose of the present invention is to provide a pulse generator which works without any mechanical contact making, which will put out very accurate control pulses and, in contrast to the various known pulse generators based on the use of a magnetic field, can be adapted to specific fields of use with very small expense because of the fact that it may be put out of action temporarily or for a longer period by an attendant in inspection and under controlled conditions.

This purpose is met in accordance with the present invention by an impulse generator which is characterized by at least one magnetic field plate arranged in an air gap disposed in the magnetic reaction circuit of a permanent magnet, and by at least one magnetically conducting body movable relatively to the field plate and having at least one control area which can pass temporarily into the air gap during the movement.

In a preferred embodiment of the invention, the field plate is located permanently in the reaction circuit of a fixed permanent magnet associated therewith, and the magnetic flux over the field plate and consequently the resistance of the field plate is dependent on the control area of the magnetically conducting body projecting into the air gap. This body may, for example, be in the form of a comb of soft iron, the teeth of which will pass through the air gap during the relative motion of the body. The magnetically conducting body may, however, be in the form of a punched strip of soft metal, the parts of which adjacent to the individual holes pass through the air gap during the relative motion between the parts and thus influence the mangetic flux through the field plate.

The pulse generator may have more than one field plate. For example, it may have two such plates, each of which is arranged in a separate air gap, the two air gaps being disposed parallel to one another in the lines of force of a permanent magnet. Sequences of pulses of displaced phase can be obtained by staggering of the two air gaps in the direction of movement of the magnetically conducting connrol body zones projecting into the said gaps.

A pulse generator in accordance with the invention has the advantage that it provides relatively powerful control pulses and that its effectiveness can readily be varied by the breaking off of teeth or the dividing weights in the magnetically conducting control bodies. Its effectiveness can also be controlled, in accordance with a further feature of the invention, by the use of at least one temporarily operative magnetically conductive shunt body which abounds or bridges over an air gap in the shunt circuit of the permanent magnet. The improved pulse generator is particularly suited for use in programmed control systems of flat knitting machines where frequently the generation of pulses is only required over specific zones of the total travel of a machine carriage guided over one or two needle beds.

For particular uses, the pulse generator may also have field plates which are disposed, in a manner known per se, in the effective zone of a permanent magnet rotating past them. In accordance with a feature of the invention the field plates are arranged on carriers which are adjustably mounted in a holder along the rotary path of travel of the permanent magnet, so that the phase of a succession of pulses thereby produced can be set in relation to the rotary movement of the permanent magnet.

BRIEF DESCRIPTION OF THE DRAWINGS

Details of the invention are described in the following description given in conjunction with the accompanying drawings which illustrate various embodiments of the invention in more or less diagrammatic fashion.

DETAILED DESCRIPTION OF THE PREFERRED EMBODIMENTS

Figure 1:
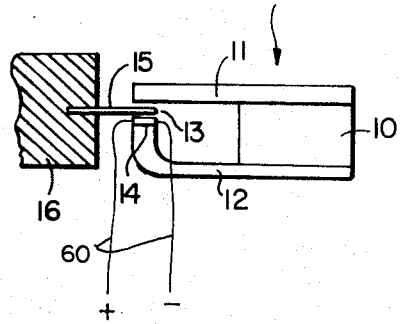
FIG. 1 is a side view partly in section on the line I—I of FIG. 2, of a first embodiment of a pulse emitter.

Referring now to the drawings, like numerals represent like elements throughout the several views.

Figure 2:
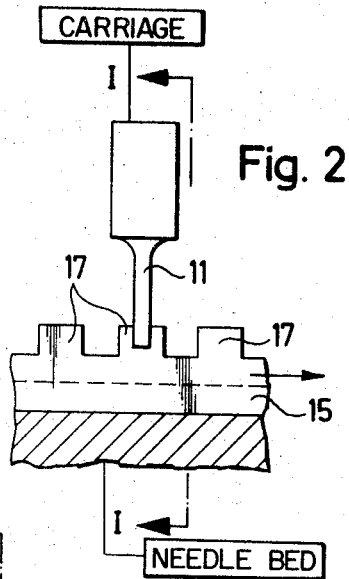
FIG. 2 is a plan view of the pulse emitter illustrated in FIG. 1, this view being seen in the direction of arrow II of FIG. 1.

The pulse generator or emitter illustrated in FIGS. 1 and 2 comprises a permanent magnet 10 with two pole limbs 11 and 12 connected thereto and having an air gap 13 between the free ends thereof. A magnetic field plate 14 is arranged at the end surface of the pole limb 12 defining one side of the air gap 13 and this plate therefore lies permanently in the reaction circuit of magnet 10.

In addition, the impulse generator has a control body in the form of a narrow comb 15 secured to a machine part 16 and advantageously having teeth 17 which can be broken off. These project into the zone of air gap 13 in permanent magnet 10.

The magnet 10 and its two pole limbs 11 and 12 are secured, by means not shown, to another machine part which is displaceable parallel to machine part 16 and in the longitudinal direction of the comb 15; for example, this further machine part may be the carriage of a flat knitting machine, with the machine part 16 fixedly connected to a needle bed of the said knitting machine. Both tooth 17 of the comb 15 determines the width of the air gap and thereby increases the magnetic flux through the pole limbs 11 and 12 and through the field plate 14 during its passage. This varies the resistance of the plate and each of these variations in resistance changes the current through conductors 60 to produce a control pulse in a known form of electronic control system (not shown). The pulse generator is dependent on the size and the relative movement which takes place between the permanent magnet 10 and the comb 15. If, for example, the teeth 17 of the comb move through air gap 13 at a uniform rate the control system delivers a succession of pulses, the frequency of which is dependent on the rate of movement of the comb and the rhythm which is dependent on the width of the teeth 17.

Figure 3:
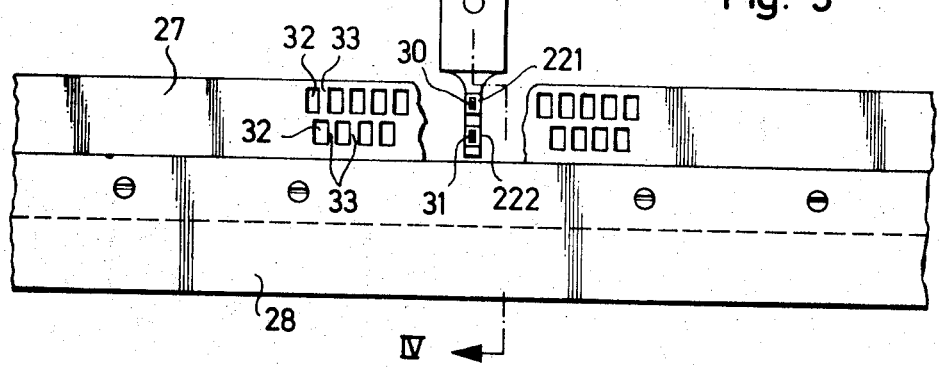
FIG. 3 is a plan view of a second embodiment of a pulse emitter as viewed in the direction of arrow III in FIG. 4, with a partial section taken through the magnetic system of the pulse emitter on the line III—III of FIG. 4 to show certain details more clearly.
Figure 4:
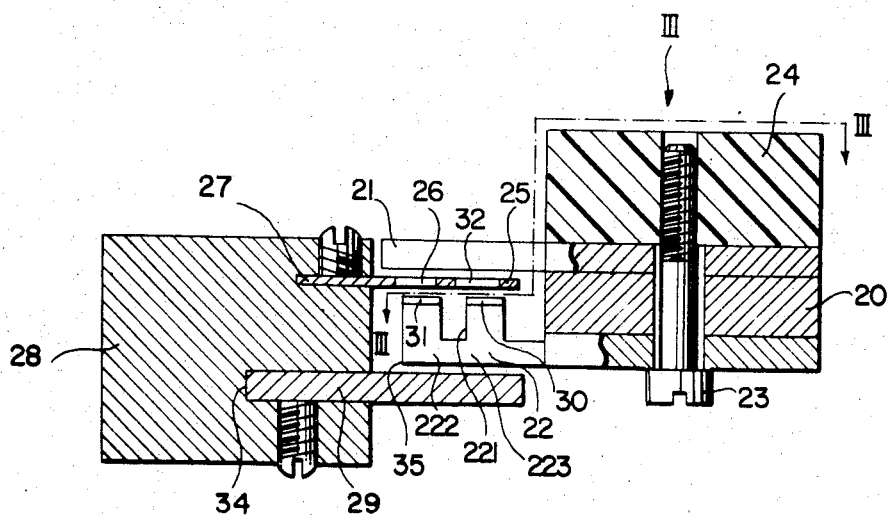
FIG. 4 is a cross-sectional view and taken on the line IV—IV of FIG. 3.

FIGS. 3 and 4 show a pulse generator with a permanent magnet 20 and two pole limbs 21 and 22. These parts are interconnected by means of a brass screw 23 which is screwed into a mounting part 24. The pole limb 22 is provided with two punched out poles 221 and 222 which, with pole limb 21, define two air gaps 25 and 26 which are flush with one another and have a perforated bar 27 projecting thereinto. This bar 27 is secured to a machine part 28 which moves relatively to the permanent magnet 20.

Magnetic plates 30 and 31, are respectively secured to the end surfaces of the two poles 221 and 222 of the pole limb 22 defining the air gap 25 and 26, these plates therefore being connected in two parallel reaction circuits of permanent magnet 20 passing through the two pole limbs 21 and 22 and the said air gaps. The perforated bar 27 is provided with two rows of windows 32 registering heightwise with the two poles 221 and 222, these windows being separated by imperforate portions 33 of the bar 27. The windows 32 of the row extending into the air gap 25 are staggered relatively to the windows 32 of the row associated with the air gap 26. The width of each of the air gaps 25 and 26, and hence the strength of the magnetic flux passing through at the field plates 30 and 31, varies with these windows 32 and imperforate portions 33 pass through the air gaps 25 and 26 respectively.

Each variation in magnetic flux produces a control signal in the electronic control system (not illustrated). If required, separate and successive phase-displaced sequences of pulses can be derived from the two field plates 30 and 31. The signals given from the two field plates could, however, even be combined to produce a common sequence of pulses.

The rhythm of the emitted pulses can be determined by the dimensions of the windows 32 in, and of the imperforate portions 33 of, the perforated bar 27 or by the interruptions in the rows of the windows, assuming that there is a uniform motion of machine part 28 relatively to the magnet 20. The impulse sequence may, however, in the embodiment illustrated in FIGS. 3 and 4, also be effected by a shunt body 29 substantially of bar form. This shunt body is displaceable on the machine part 28, being located in a retaining groove 34 in the latter and movable longitudinally with respect to machine part 28, and parallel to the perforated bar 27, whereby the said body and the free end 223 of pole limb 22 define between them a very narrow air gap 35. This produces a shunt circuit for the lines of force of the magnetic field of the permanent magnet 20 through this air gap 35 and weakens the magnetic flux through field plates 30 and 31. The residual flux through these plates is insufficient to activate these again.

Figure 5:
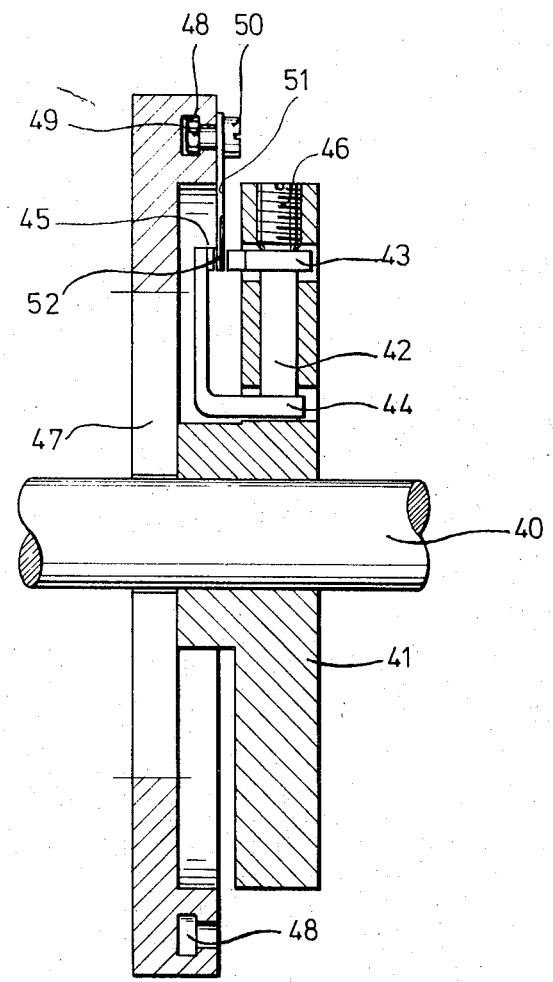
FIG. 5 is a central section through a rotating pulse generator representing a third embodiment of the invention.

FIG. 5 depicts a third embodiment of the invention in the form of a pulse generator which differs from the first two embodiments in the fact that the magnetic system is moved relatively to the field plates. This further form of pulse generator comprises a shaft 40 which is driven from a machine and has secured thereon a magnet carrier plate 41. A number of magnets can be set in this plate, although in FIG. 4 one permanent magnet 42 only is shown. This magnet 42 is provided with two pole limbs 43 and 44 the ends of which mutually define between them an air gap 45. The permanent magnet 42 is secured in the magnet carrier plate 41 by means of a setscrew 46.

The pulse generator illustrated in FIG. 5 also has a stationary mounting disc 47 which has formed in its peripheral margin an annular groove 48 adapted to accomodate nuts 49 cooperating with fastening screws 50 by means of which carrier bars such as 51 can be secured to the disc 47. The free ends of these bars 51 project into the zone of the air gap 45 of the rotary magnet system and are each provided at their free end with a field plate 52. Any required number of carrier bars 51 may be secured at the required relative angular position around the periphery of the disc 47. Each time a field plate 52 secured to the end of a bar 51 passes through the air gap 45, the resistance of this plate varies and a control impulse is consequently emitted. The field plates, of which a circular series is preferably provided, may deliver separate sequences of pulses, or the signals therefrom can be combined to deliver a common pulse sequence.

Although the invention has been described in considerable detail with respect to preferred embodiments thereof, it will be apparent that the invention is capable of numerous modifications and variations apparent to those skilled in the art without departing from the spirit and scope of the invention.

We claim:

1. A knitting machine having a carriage machine part movable relative to a needle bed machine part, a pulse generator having cooperating parts on said carriage and said needle bed machine parts, respectively, said generator comprising:

a permanent magnet on the first machine part, said permanent magnet having an air gap disposed in the magnetic reaction circuit of the permanent magnet.

at least one magnetic field plate arranged in said air gap such that the electrical resistance characteristics of the field plate depend on the magnetic flux within the air gap, means for passing an electrical current through the field plate, changes in the electrical resistance of said field plate changing the current therethrough so as to define the pulse, and at least one magnetically conducting body arranged on the other machine part such that upon relative movement of the machine parts, the permanent magnet and the magnetically conducting body are relatively movable such that at least one control area on the magnetically conducting body passes temporarily into the air gap to change the magnetic flux within the air gap and hence change the electrical resistance through the field plate.

2. A knitting machine according to claim 1, wherein the magnetically conducting body is in the form of a comb of soft iron having teeth, said teeth arranged to pass through the air gap during the said relative movement of the parts of the machine.

3. A knitting machine according to claim 1, wherein the magnetically conducting body is an apertured bar of soft iron having openings and intervening imperforate portions arranged to pass through the air gap during the said relative movement.

4. A knitting machine according to claim 1, which includes two magnetic field plates which are respectively arranged in two separate air gaps arranged parallel to one another in the reaction part of said permanent magnet.

5. A knitting machine according to claim 1, which includes two magnetic field plates which are arranged respectively in two separate air gaps arranged parallel to one another in the reaction part of said permanent magnet, and wherein the magnetically conducting body is an apertured bar of soft iron having two rows of openings and intervening imperforate portions, each of said rows corresponding to one of said air gaps and arranged to pass through its respective air gap during said relative movement.

6. A knitting machine according to claim 1, including a magnetically conducting shunt body attached to the said other machine parts so as to temporarily define an air gap in a shunt circuit of the permanent magnet upon said relative movement of the machine parts.

7. A knitting machine according to claim 1, including a magnetically conducting shunt body attached to the said other machine part so as to temporarily and completely bridge the said air gap upon relative movement of the machine parts.

8. A knitting machine according to claim 1, said permanent magnet and its respective field plate being mounted on a carrier which rotates about an axis, said magnetically conducting bodies being fixed about the path of movement of the air gap of the permanent magnet.

9. A pulse generator for an electrical control system of a machine of the type having first and second parts movable relative to each other, comprising:

a permanent magnet on the first machine part, said permanent magnet having an air gap disposed in the magnetic reaction circuit of the permanent magnet.

at least one magnetic field plate arranged in said air gap such that the electrical resistance characteristics of the field plate would depend on the magnetic flux within the air gap, and at least one magnetically conducting body arranged on the other machine part such that upon relative movement of the machine parts, the permanent magnet and the magnetically conducting body are relatively movable such that at least one control area on the magnetically conducting body passes temporarily into the air gap, and including a magnetically conducting shunt body attached to the said other machine parts so as to temporarily define an air gap in a shunt circuit of the permanent magnet upon said relative movement of the machine parts.

10. A pulse generator for an electrical control system of a machine of the type having first and second parts movable relative to each other, comprising:

a permanet magnet on the first machine part, said permanent magnet having an air gap disposed in the magnetic reaction circuit of the permanent magnet, at least one magnetic field plate arranged in said air gap such that the electrical resistance characteristics of the field plate would depend on the magnetic flux within the air gap, and at least one magnetically-conducting body arranged on the other machine part such that upon relative movement of the machine parts, the permanent magnet and the magnetically conducting body are relatively movable such that at least one control area on the magnetically conducting body passes temporarily into the air gap, and including a magnetically conducting shunt body attached to the said other machine part so as to temporarily and completely bridge the said air gap upon relative movement of the machine parts.

* * * * *